United States Patent
Evans et al.

(10) Patent No.: US 7,639,265 B2
(45) Date of Patent: Dec. 29, 2009

(54) IMAGE FORMATS FOR VIDEO CAPTURE, PROCESSING AND DISPLAY

(75) Inventors: Glenn F. Evans, Kirkland, WA (US); Stephen J. Estrop, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/851,376

(22) Filed: Sep. 6, 2007

(65) Prior Publication Data

US 2007/0296732 A1 Dec. 27, 2007

Related U.S. Application Data

(62) Division of application No. 10/798,874, filed on Mar. 10, 2004.

(51) Int. Cl.
*G09G 5/02* (2006.01)

(52) U.S. Cl. ................ 345/589; 345/603; 345/604; 345/605

(58) Field of Classification Search .......... None
See application file for complete search history.

(56) References Cited

U.S. PATENT DOCUMENTS

| | | |
|---|---|---|
| 5,414,469 A | 5/1995 | Gonzales et al. |
| 5,465,118 A | 11/1995 | Hancock et al. |
| 5,467,134 A | 11/1995 | Laney et al. |
| 5,544,286 A | 8/1996 | Laney |
| 5,611,038 A | 3/1997 | Shaw et al. |
| 5,699,124 A | 12/1997 | Nuber et al. |
| 5,737,023 A | 4/1998 | Linzer |
| 5,764,296 A | 6/1998 | Shin |

(Continued)

FOREIGN PATENT DOCUMENTS

EP 0600613 A2 6/1994

(Continued)

OTHER PUBLICATIONS

Title: Re: GL_RGBA8 vs GL_RGB5_A1 vs GL_RGBA; Author: Dario Accornero; Jul. 25, 2003, p. 1; http://lists.apple.com/archives/Mac-opengl/2003/Jul/msg00154.html.*

(Continued)

*Primary Examiner*—Kee M Tung
*Assistant Examiner*—Jwalant Amin
(74) *Attorney, Agent, or Firm*—Klarquist Sparkman, LLP

(57) ABSTRACT

Techniques and tools for representing pixel data in a video processing or capture system are described. Described techniques and tools provide efficient color representation for video processing and capture, and provide flexibility for representing colors using different bit precisions and memory layouts. Described techniques and tools include video formats that can be used, for example, in hardware or software for capture, processing, and display purposes. In one aspect, chroma and luma information for a pixel in a video image is represented in a 16-bit fixed-point block of data having an integer and fractional components. Data can be easily converted from one representation to another (e.g., between 16-bit and 10-bit representations). In other aspects, formats for representing 8-, 10- and 16-bit video image data (e.g., packed and hybrid planar formats), and codes for indicating the formats, are described.

12 Claims, 13 Drawing Sheets

U.S. PATENT DOCUMENTS

| | | | |
|---|---|---|---|
| RE35,910 | E | 9/1998 | Nagata et al. |
| 5,821,986 | A | 10/1998 | Yuan et al. |
| 5,828,421 | A | 10/1998 | Boyce et al. |
| 5,844,571 | A * | 12/1998 | Narayanaswami .......... 345/422 |
| 5,864,637 | A | 1/1999 | Liu et al. |
| 5,970,173 | A | 10/1999 | Lee et al. |
| 6,002,801 | A | 12/1999 | Strongin et al. |
| 6,104,434 | A | 8/2000 | Nakagawa et al. |
| 6,115,031 | A | 9/2000 | Love |
| 6,239,815 | B1 * | 5/2001 | Frink et al. .................. 345/502 |
| 6,256,347 | B1 | 7/2001 | Yu et al. |
| 6,259,810 | B1 | 7/2001 | Gill et al. |
| 6,389,071 | B1 | 5/2002 | Wilson |
| 6,396,422 | B1 | 5/2002 | Barkan |
| 6,418,166 | B1 | 7/2002 | Wu et al. |
| 6,483,938 | B1 | 11/2002 | Hennessey et al. |
| 6,499,060 | B1 | 12/2002 | Wang et al. |
| 6,510,177 | B1 | 1/2003 | De Bonet et al. |
| 6,519,288 | B1 | 2/2003 | Vetro et al. |
| 6,600,785 | B1 | 7/2003 | Nishigori et al. |
| 6,606,418 | B2 | 8/2003 | Mitchell et al. |
| 6,728,317 | B1 | 4/2004 | Demos |
| 6,778,711 | B2 | 8/2004 | Morita |
| 6,823,014 | B2 | 11/2004 | Kim |
| 6,831,951 | B2 | 12/2004 | Yamada |
| 6,937,291 | B1 | 8/2005 | Gryskiewicz |
| 7,155,055 | B2 | 12/2006 | Malvar |
| 7,242,717 | B2 | 7/2007 | Li et al. |
| 2001/0025292 | A1 | 9/2001 | Denk et al. |
| 2002/0009143 | A1 | 1/2002 | Arye |
| 2002/0064226 | A1 | 5/2002 | Bauer et al. |
| 2002/0154693 | A1 | 10/2002 | Demos et al. |
| 2002/0186890 | A1 | 12/2002 | Lee et al. |
| 2003/0044076 | A1 | 3/2003 | Mitchell et al. |
| 2003/0128893 | A1 | 7/2003 | Castorina et al. |
| 2003/0151610 | A1* | 8/2003 | Kuriakin et al. ............. 345/589 |
| 2003/0202589 | A1 | 10/2003 | Reitmeier et al. |
| 2004/0042549 | A1 | 3/2004 | Huang et al. |
| 2004/0183949 | A1 | 9/2004 | Lundberg et al. |
| 2004/0184657 | A1 | 9/2004 | Lin et al. |
| 2004/0190771 | A1 | 9/2004 | Eid et al. |
| 2004/0213345 | A1 | 10/2004 | Holcomb et al. |
| 2004/0218678 | A1 | 11/2004 | Tardif |
| 2005/0013373 | A1 | 1/2005 | Lin et al. |
| 2005/0041878 | A1 | 2/2005 | Schwartz et al. |
| 2005/0047676 | A1 | 3/2005 | Kang et al. |
| 2005/0063471 | A1 | 3/2005 | Regunathan et al. |
| 2005/0089239 | A1 | 4/2005 | Brajovic |
| 2005/0123283 | A1 | 6/2005 | Li |
| 2005/0200630 | A1 | 9/2005 | Evans et al. |
| 2005/0243176 | A1 | 11/2005 | Wu et al. |
| 2006/0007502 | A1 | 1/2006 | Debevec et al. |
| 2008/0019449 | A1 | 1/2008 | Lin et al. |

FOREIGN PATENT DOCUMENTS

| | | |
|---|---|---|
| JP | 4-207684 | 7/1992 |
| JP | 2000-165866 | 6/2000 |
| JP | 2006-279741 | 10/2006 |
| WO | WO 99/59329 | 11/1999 |
| WO | WO 00/33581 | 6/2000 |
| WO | WO 01/95633 | 12/2001 |

OTHER PUBLICATIONS

Title: SGI DMediaPro DM3: High-Definition and Standard-Definition Video I/O Option, Author: SGI, pp. 2, Date: Jul. 18, 2003.*
Title: "Uncompressed Y'CbCr Video in QuickTime Files: Version Dec. 14, 1999," Author: Pirazzi et al., pp. 37, Date: Dec. 14, 1999.*
Title: PNG format [was: background image not displayed], Author: Claus Cyrny, Date: Dec. 7, 2001, pp. 3.*

Agnoli, "QuickTime Pixel Format FourCCs," 5 pp. [Downloaded from the World Wide Web on Feb. 9, 2004].
Apple Computer, Inc., "Color Packing for Color Spaces (IM: ACI Ref)," 2 pp. [Downloaded from the World Wide Web on Feb. 9, 2004].
Apple Computer, Inc., "ColorSync Manager Reference: Color Packing for Color Spaces," 3 pp. [Downloaded from the World Wide Web on Feb. 9, 2004].
Cornell University, "RGBE Image Format Specifications," 1 p. (document dated Apr. 29, 1998) [Downloaded from the World Wide Web on Apr. 20, 2006].
FOURCC.org, "Compressed Formats," 17 pp. [Downloaded from the World Wide Web on Feb. 9, 2004].
FOURCC.org, "YUV Formats," 15 pp. [Downloaded from the World Wide Web on Feb. 9, 2004].
FOURCC.org, "RGB Formats," 6 pp. [Downloaded from the World Wide Web on Feb. 9, 2004].
Industrial Light & Magic, "Technical Introduction to OpenEXR," 13 pp. (Feb. 2005).
Jack, *Video Demystified: A Handbook for the Digital Engineer*, LLH Technology Publishing, pp. 15-34 (3d ed. 2001).
Krapf et al., "HDRI: High Dynamic Range Image," Dosch Design, 18 pp. (2005).
Mantiuk et al., "Perception-Motivated High Dynamic Range Video Encoding", *ACM Transactions on Graphics*, vol. 23, Issue 3, pp. 733-741 (Aug. 2004).
Microsoft Corporation, "4:2:0 Video Pixel Formats," 1 p. [Downloaded from the World Wide Web on Feb. 9, 2004].
Microsoft Corporation, "4:2:2 Video Pixel Formats," 1 p. [Downloaded from the World Wide Web on Feb. 9, 2004].
Microsoft Corporation, "FOURCC for Video Compression," 6 pp. [Downloaded from the World Wide Web on Feb. 9, 2004].
Microsoft Corporation, "FOURCC Codes," 1 p. [Downloaded from the World Wide Web on Feb. 16, 2004].
Microsoft Corporation, "Registered FOURCC Codes and Wave Formats," 20 pp. (Sep. 2003) [Downloaded from the World Wide Web on Mar. 5, 2004].
Microsoft Corporation, "YUV Video Subtypes," 2 pp. [Downloaded from the World Wide Web on Feb. 16, 2004].
Motorola Corp., *M68000 8-/16-/32-Bit Microprocessors Programmer's Reference Manual*, Prentice-Hall, p. B-35 (5th ed. 1986).
Pirazzi et al., "Uncompressed Y'CbCr Video in QuickTime Files: Version Dec. 14, 1999," 37 pp., [Downloaded from the World Wide Web on Feb. 9, 2004].
Pittsburgh Supercomputing Center, "The IEEE Standard for Floating Point Arithmetic," 3 pp. [Downloaded from the World Wide Web].
SMPTE, "SMPTE 274-1998: SMPTE Standard for Television—1920×1080 Scanning and Analog and Parallel Digital Interfaces for Multiple Picture Rates," 24 pp. (1998).
Sullivan et al., "Video Rendering With 8-Bit YUV Formats," 12 pp. [Downloaded from the World Wide Web on Feb. 9, 2004].
"The Radiance Picture File Format," 21 pp. (document dated 1991-1994) [Downloaded from the World Wide Web].
Ward et al., "Subband Encoding of High Dynamic Range Imagery", *Proceedings of the 1st Symposium on Applied Perception in Graphics and Visualization*, pp. 83-90, Los Angeles, CA (2004).
Ward, "High Dynamic Range Image Encodings," Anyhere Software, 28 pp. (undated document) [Downloaded from the World Wide Web].
Ward Larson, "Overcoming Gamut and Dynamic Range Limitations in Digital Images", *Proceedings of the Sixth Color Imaging Conference*, 6 pp. (Nov. 1998).
Xu et al., "High-Dynamic Range Still-Image Encoding in JPEG 2000", *IEEE Computer Graphics and Applications*, pp. 57-64 (Nov./Dec. 2005).
International Search Report and Written Opinion for PCT/US2008/054481, Aug. 5, 2008, 10 pages.
U.S. Appl. No. 60/341,674, filed Dec. 17, 2001, Lee et al.
U.S. Appl. No. 60/488,710, filed Jul. 18, 2003, Srinivasan et al.
U.S. Appl. No. 60/501,081, filed Sep. 7, 2003, Srinivasan et al.
Aaron, "Wyner-Ziv Coding of Motion Video," Information Systems Laboratory Stanford University, 11 pp. (last modified Nov. 7, 2002).
Brainard et al., "Composite Television Coding: Subsampling and Interpolation," SMPTE Journal, pp. 717-724 (Aug. 1982).

Catmull et al., "A Class of Local Interpolating Splines," Computer Aided Geometric Design, Academic Press, pp. 317-326 (1974).

"DivX Multi Standard Video Encoder," 2 pp.

Dufaux et al., "Abstract: Motion-compensated generic coding of video based on a multi resolution data structure," 2 pp. (1993) [downloaded from the World Wide Web on Jan. 25, 2006].

Einarsson et al., "Mixed Resolution Video Coding for Low Bit-Rate Channels," Proc. Int'l Workshop on Coding Techniques for Very Low Bit-Rate Video: VLBV97, Linköping, Sweden, pp. 77-80 (Jul. 1997).

ISO/IEC, "ISO/IEC 11172-2, Information Technology—Coding of Moving Pictures and Associated Audio for Digital Storage Media at up to About 1.5 Mbit/s—Part 2: Video," 122 pp. (1993).

ISO/IEC, "JTC1/SC29/WG11 N2202, Information Technology—Coding of Audio-Visual Objects: Visual, ISO/IEC 14496-2," 329 pp. (1998).

ITU-T, "ITU-T Recommendation H.261, Video Codec for Audiovisual Services at *p*×64 kbits," 25 pp. (1993).

ITU-T, "ITU-T Recommendation H.262, Information Technology—Generic Coding of Moving Pictures and Associated Audio Information: Video," 205 pp. (1995).

ITU-T, "ITU-T Recommendation H.263, Video coding for low bit rate communication," 162 pp. (1998).

ITU, "ITU-T Recommendation H.264: Advanced Video Coding for generic audiovisual services (May 2003)," 281 pp. (2004).

Iwahashi et al., "A Motion Compensation Technique for Downscaled Pictures in Layered Coding," IEICE Transactions on Comm., vol. E77-B , No. 8, pp. 1007-1012 (Aug. 1994).

Joint Video Team (JVT) of ISO/IEC MPEG and ITU-T VCEG, "Draft of Joint Scalable Video Model JSVM-4 Annex G," JVT-Q201, Nice, France, 166 pp. (Oct. 2005).

Joint Video Team (JVT) of ISO/IEC MPEG and ITU-T VCEG, "Joint Committee Draft (CD)," JVT-C167, 3rd Meeting; Fairfax, Virginia, USA, 142 pp. (May 2002).

Joint Video Team (JVT) of ISO/IEC MPEG & ITU-T VCEG, "Joint Final Committee Draft (JFCD) of Joint Video Specification," JVT-D157, 207 pp. (Aug. 2002).

Joint Video Team (JVT) of ISO/IEC MPEG and ITU-T VCEG, "Joint Draft 7 of SVC Amendment (revision 2)," JVT-T201r2, Annex G, Klagenfurt, Austria, pp. i-xvii, 353-540 (Oct. 2005).

Keys, "Cubic Convolution Interpolation for Digital Image Processing," *Computer Graphics*, vol. ASSP-29, No. 6, pp. 1153-1160 (Dec. 1981).

Kwon et al., "Adaptive Bitrate Allocation in Spatial Scalable Video Coding of Fixed Total Bitrate," *IEICE Trans. Fundamentals*, vol. E81-A, No. 5, pp. 950-956 (May 1998).

Microsoft Corporation, "Microsoft Debuts New Windows Media Player 9 Series, Redefining Digital Media on the PC," 4 pp. (Sep. 4, 2002) [Downloaded from the World Wide Web on May 14, 2004].

Mitchell et al., "Reconstruction Filters in Computer Graphics," *Computer Graphics*, vol. 22, No. 4 pp. 221-228 (Aug. 1988).

Mook, "Next-Gen Windows Media Player Leaks to the Web," *BetaNews*, 17 pp. (Jul. 2002) [Downloaded from the World Wide Web on Aug. 8, 2003].

Printouts of FTP directories from http://ftp3.itu.ch, 8 pp. (downloaded from the World Wide Web on Sep. 20, 2005).

Reader, "History of MPEG Video Compression—Ver. 4.0," 99 pp. (document marked Dec. 16, 2003).

Segall, "Study of Upsampling/Downsampling for Spatial Scalability," JVT-Q083, Nice, France, 18 pp. (Oct. 2005).

Sullivan, "Color Format Upconversion for Video Display," JVT-1019, San Diego, 6 pp. (Sep. 2003).

Sullivan et al., "The H.264/AVC Advanced Video Coding Standard: Overview and Introduction to the Fidelity Range Extensions," 21 pp. (Aug. 2004).

Sullivan, "Position Calculation for SVC Upsampling," JVT-R067, Bangkok, Thailand, 7 pp. (Jan. 2006).

Sullivan et al., "Position Calculation for SVC Upsampling," JVT-S067, Geneva, Switzerland, 12 pp. (Mar. 2006).

Sullivan, "Position Calculation for SVC Upsampling," JVT-U067, Hangzhou, China, 7 pp. (Oct. 2006).

Sun et al., "Unified Solution for Spatial Scalability," JVT-R018, Bangkok, Thailand, 6 pp. (Jan. 2006).

Wien, "Variable Block-Size Transforms for Hybrid Video Coding," Dissertation, 182 pp. (Feb. 2004).

* cited by examiner

Software 380 implementing described techniques and tools for video image formats

IMAGE FORMATS FOR VIDEO CAPTURE, PROCESSING AND DISPLAY

CROSS REFERENCE TO RELATED APPLICATIONS

This application is a Divisional of U.S. patent application Ser. No. 10/798,874, filed on Mar. 10, 2004, entitled, "IMAGE FORMATS FOR VIDEO CAPTURE, PROCESSING AND DISPLAY," now pending, which is herein incorporated by reference in its entirety.

TECHNICAL FIELD

This invention relates to image formats in video systems, and more particularly relates to image formats for pixel data in color spaces having luma and chroma channels.

BACKGROUND

In video and imaging systems, color generally is represented as vector coordinates in a three dimensional "color space." Common examples include the well-known classes of RGB and YUV color spaces. The RGB color spaces specify pixel values using coordinates that represent intensities of red, green and blue light, respectively. The YUV color spaces specify pixel values using coordinates that represent a luminance or chrominance value.

Due to the nonlinear response of cathode ray tube (CRT) monitors (also known as the monitor's gamma), data is often specified as intensity values relative to the inverse of the gamma. For example, in YUV color spaces, actual values stored relative to the inverse gamma (typically denoted using an apostrophe) are referred to as the "luma" value (Y') and "chroma" values (U' and V'). RGB data stored relative to the inverse gamma is typically denoted using the notation R'G'B'. This form of data is also known as 'nonlinear' YUV or RGB data.

When YUV data is stored in a digital or analog form, the ranges for each of the components are typically distinguished using a variation of the YUV notation. For example, the notation Y'Pb'Pr' refers to nonlinear YUV data where the Y component is in the range of [0 . . . 1] (0 being black, 1 being white) and the chroma components range from [−0.5 . . . 0.5]. As another example, data stored in an 8-bit or 10-bit fixed point approximation is denoted using the notation Y'Cb'Cr'.

For video, pixel data is typically represented using the YUV color spaces, which can be derived from RGB information. Conversion between the RGB and YUV color spaces typically involves a simple transform. For example, the Y'Pb'Pr' color data is a variation of the R'G'B' color space where the Y' component is proportional to the perceptual brightness (Y'=0.299R'+0.587G'+0.114B'), and the Pb' and Pr' components are defined as color difference from the brightness (e.g., Pb'=B'−Y'; Pr'=R'−Y').

When Y'Pb'Pr' is stored in an 8-bit approximation, the Y' range [0 . . . 1] is mapped to the range 16 . . . 235. The chroma components Pb' and Pr' are mapped to their corresponding Cb' and Cr' components by mapping the range of [−0.5 . . . 0.5] to an interval of width 224 centered about 128 (i.e. 16 to 240). For example, an 8-bit representation is computed as:

$Y'=16+Y'*219$ $Cb'=128+Pb'*224$ $Cr'=128+Pr'*224$

Higher bit precisions are computed by simply scaling up the 8-bit values. For example, an n-bit representation is computed as:

$Y'=(16+Y'*219)*2^{n-8}$ $Cb'=(128+Pb'*224)*2^{n-8}$ $Cr'=(128+Pr'*224)*2^{n-8}$

Pixel data can be stored in a packed format or planar format. In a packed format, the components corresponding to a given pixel are stored as a cluster or group in a single array in memory, and data for all components can be obtained in a single read. Packed formats can be convenient when performing operations on an entire pixel, but can be inefficient if an operation on a single channel (e.g., an operation on the R channel for an RGB pixel) is desired.

For example, in FIG. 1 an RGB pixel in an 8-bit per channel representation is stored in packed format as a little-endian DWORD 100. The data for the RGB pixel comprises 24 bits of color information in adjacent bytes in memory (one byte each for the R, G, and B channels), along with an 8-bit alpha (or transparency) value. Because DWORD 100 is little-endian, Byte 0 (which contains the alpha value) appears on the far right as the least significant byte. As shown in FIG. 1, in an 8-bit representation a pixel with three full-resolution channels of color information will have 24 bits of color data. For memory alignment and access efficiency reasons, pixel data is often stored on a 16- or 32-bit boundary. Therefore, a pixel with 24 bits of color data is typically stored along with an 8-bit alpha value, so that the pixel data for each pixel occupies 32 bits.

In a planar format, information from different channels is stored in separate planes, rather than being grouped into a single array. For example, in FIG. 2 data for an RGB image 200 is stored in an R plane 210, a G plane 220, and a B plane 230. In an 8-bit representation, each pixel would include 8 bits of information from each plane. Planar formats can be inefficient when performing operations on an entire pixel because getting data for an entire pixel requires three reads—one for each plane. However, planar formats can be convenient in other situations, such as when performing an operation on a single channel (e.g., filtering out all of the red in an RGB image).

Because human perception is not as sensitive to color changes as it is to brightness changes, chroma components can be sampled at a lower spatial resolution than the luma components with little perceived loss in image quality. For example, in a "4:2:2" sub-sampling format, a pair of chroma samples (e.g., a pair of Cr' and Cb' samples) is "shared" between two luma samples. In other words, a 4:2:2 image has one pair of chroma samples for every two luma samples—the chroma samples are sub-sampled by a factor of two in the horizontal direction.

Table 1 describes several common sub-sampling formats.

TABLE 1

Sub-sampling formats

| Sub-sampling format | Definition |
|---|---|
| 4:4:4 | For every luma sample, there is a pair of corresponding chroma samples (e.g., a Cb' and Cr' sample). |
| 4:2:2 | For every two horizontal luma samples, there is a pair of corresponding chroma samples. (Horizontally, there is half as much chroma information as luma information.) |

TABLE 1-continued

Sub-sampling formats

| Sub-sampling format | Definition |
|---|---|
| 4:1:1 | For every four horizontal luma samples, there is a pair of corresponding chroma samples. (Horizontally, there is a quarter as much chroma information as luma information.) |
| 4:2:0 | For each 2 × 2 square of luma samples, there is a corresponding pair of chroma samples. (Chroma information is sampled both vertically and horizontally at half the resolution of the luma samples.) |

For more information on color spaces and sub-sampling formats, see, e.g., Keith Jack, *Video Demystified: A Handbook for the Digital Engineer*, LLH Technology Publishing (3d ed. 2001).

Whatever the benefits of previous techniques, they do not have the advantages of the following tools and techniques.

SUMMARY

In summary, techniques and tools for representing pixel data in a video processing or capture system are described. Described techniques and tools provide efficient color representation for video processing and capture, and provide flexibility for representing colors using different bit precisions and memory layouts. Described techniques and tools include video formats that can be used, for example, in hardware or software for capture, processing, and display purposes.

In one aspect, chroma and luma information for a pixel in a video image is represented in an n-bit representation comprising a 16-bit fixed-point block of data. The most significant byte in the 16-bit unit of data is an integer component, and the least significant byte in the 16-bit unit of data is a fractional component. The n-bit representation is convertible to a lower-precision representation by assigning zero values to one or more of the bits in the least significant byte. For example, the n-bit representation can be converted to an (n-m)-bit representation by assigning zero values to the m least-significant bits in the least-significant byte.

In another aspect, chroma and luma information for a pixel in a video image is represented in an n-bit representation comprising a 16-bit fixed-point block of data. The most significant byte in the 16-bit unit of data is an integer component, and the least significant byte in the 16-bit unit of data is a fractional component. The n-bit representation (e.g., a 10-bit representation) is convertible to a higher-precision representation (e.g., a 16-bit representation) by changing an identifier (e.g., a FOURCC code) for the video data.

In another aspect, data for a video image is represented in a packed format representation, the video data consisting of color channel data (e.g., in a YUV color space) and alpha channel data (e.g., 2 bits per pixel, 16 bits per pixel, or some other number of bits per pixel) for each of plural pixels in the video image. The packed format representation has a color channel bit precision of greater than eight bits per color channel (e.g., 10 bits per channel, 16 bits per channel, or some other bit precision). The video data can be in different sub-sampling formats (e.g., 4:4:4, 4:2:2, or some other sub-sampling format).

In another aspect, pixel data for a video image is represented in a packed format by storing first luma data for a first pixel in a first unit of memory, storing first chroma data shared by the first pixel and a second pixels in a second unit of memory at a higher memory address than the first unit, storing second luma data for the second pixel in a third unit of memory at a higher memory address than the second unit, and storing second chroma data shared by the first and second pixels in a fourth unit of memory at a higher memory address than the third unit. The first and second luma data and the first and second chroma data have a bit precision of greater than 8 bits (e.g., 10 bits, 16 bits or some other number of bits) per channel.

In another aspect, a four-character code is operable to indicate a format of digital video data in a computer system. The four-character code comprises a first character based on whether the format is a packed format or a hybrid planar format, a second character based on chroma sampling (e.g., 4:2:2 sub-sampling, 4:2:0 sub-sampling, etc.) in the format, and third and fourth characters based on a bit precision (e.g., 8, 10, 16, or some other number of bits per channel). The four character code can be included in a file header of a file containing the digital video data. The four-character code can be changed to cast the format of the digital video data to a different bit precision.

In another aspect, data for a video image is represented in a hybrid planar format. The hybrid planar format has a bit precision of greater than eight bits per channel and includes a first array comprising luma information for pixels in the video image and a second array comprising chroma information for the pixels. The chroma information is stored within the second array in a packed format. The hybrid planar format can be used with different sub-sampling formats.

In another aspect, data for a video image is represented in a hybrid planar format. The hybrid planar format has a bit precision of greater than or equal to eight bits per channel. The hybrid planar format includes a first array comprising luma information for pixels in the video image and a second array comprising chroma information for the pixels. The chroma information is stored within the second array in a packed format and is sub-sampled in the horizontal direction by a factor of two.

The various techniques and tools can be used in combination or independently. Different embodiments implement one or more of the described techniques and tools.

Additional features and advantages will be made apparent from the following detailed description of different embodiments that proceeds with reference to the accompanying drawings.

DETAILED DESCRIPTION

The following description is directed to techniques and tools for representing pixel data in a video processing or capture system. Described techniques and tools provide efficient color representation for video processing and capture, and provide flexibility for representing colors using different bit precisions (e.g., 8, 10 or 16 bits per channel).

Described techniques and tools include image representation formats that can be used, for example, in hardware or software for capture, processing, and display purposes. For example, different packed formats and planar formats (e.g., hybrid planar formats) are described.

For example, in a described embodiment, color is represented in a 10-bit hybrid planar format in a YUV color space. The 10-bit hybrid planar format involves a plane of luma (Y) information combined with packed chroma (U and V) pairs. The 10-bit hybrid planar format allows efficient video processing because of its hardware-friendly memory layout.

Described techniques and tools provide an efficient and simple mechanism to switch between different bit precisions and to define alpha channels. Described techniques and tools can be applied to several different sub-sampling formats (e.g., 4:4:4, 4:2:2, 4:2:0 and 4:1:1). Different formats offer different advantages in terms of visual quality, bandwidth and/or processing efficiency.

I. Computing Environment

The techniques and tools described above can be implemented on any of a variety of computing devices and environments, including computers of various form factors (personal, workstation, server, handheld, laptop, tablet, or other mobile), distributed computing networks, and Web services, as a few general examples. The techniques and tools can be implemented in hardware circuitry, as well as in software executing within a computer or other computing environment, such as shown in FIG. 3.

Figure 1:
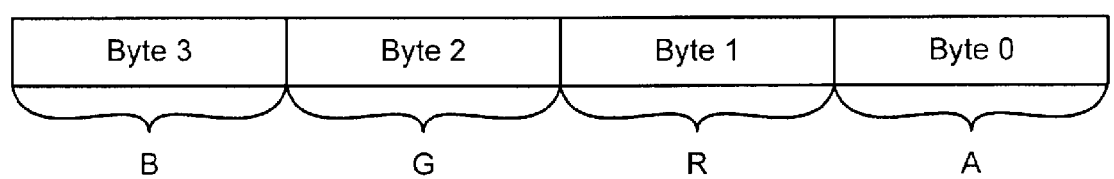
FIG. 1 is a block diagram showing an RGB pixel in an 8-bit per channel representation stored in packed format as a little-endian DWORD.
Figure 2:
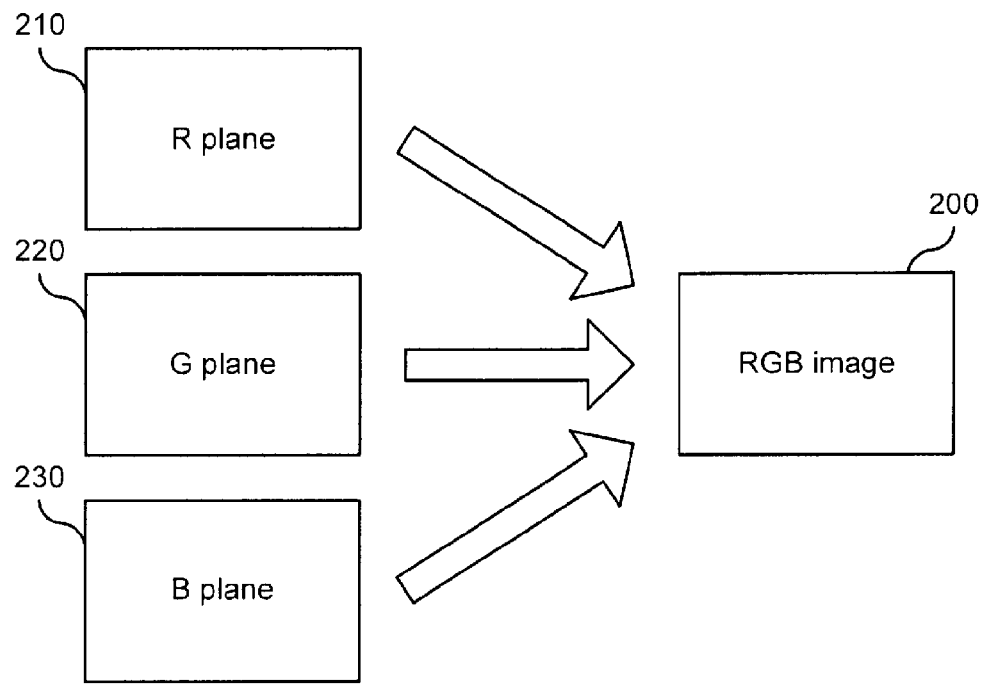
FIG. 2 is a block diagram showing a planar format for an RGB image.
Figure 3:
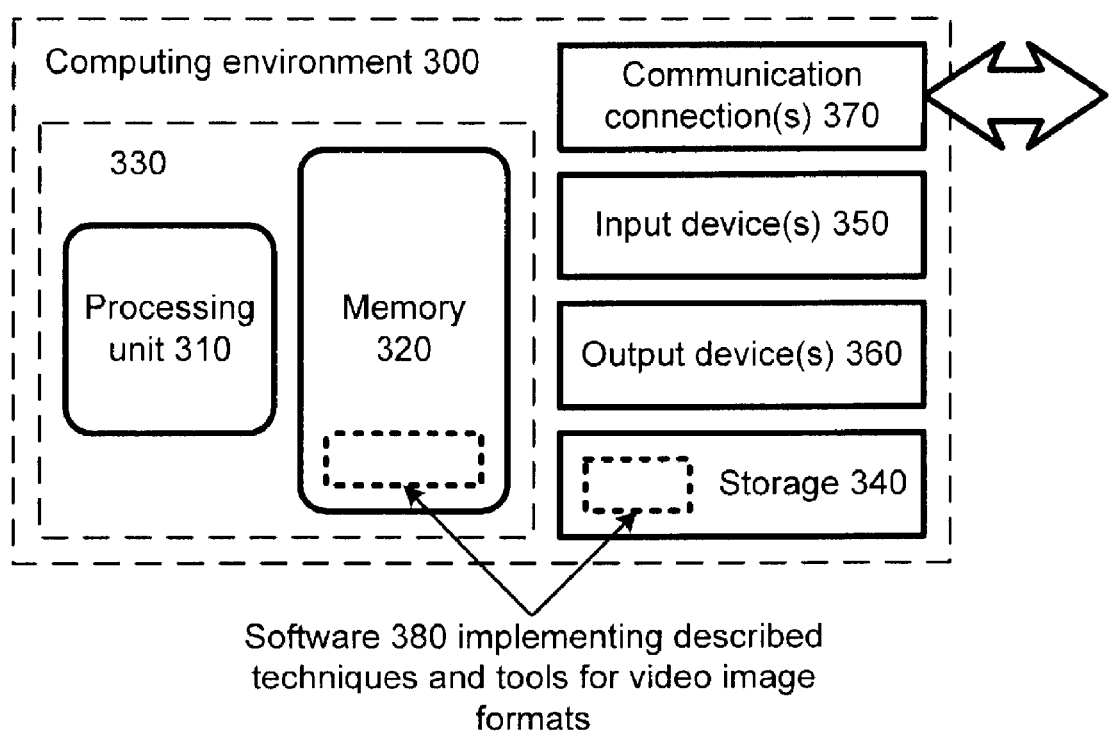
FIG. 3 is a block diagram of a suitable computing environment for implementing techniques and tools for video image formats.

FIG. 3 illustrates a generalized example of a suitable computing environment 300 in which described techniques and tools can be implemented. The computing environment 300 is not intended to suggest any limitation as to scope of use or functionality of the invention, as the present invention may be implemented in diverse general-purpose or special-purpose computing environments.

With reference to FIG. 3, the computing environment 300 includes at least one processing unit 310 and memory 320. In FIG. 3, this most basic configuration 330 is included within a dashed line. The processing unit 310 executes computer-executable instructions and may be a real or a virtual processor. In a multi-processing system, multiple processing units execute computer-executable instructions to increase processing power. The memory 320 may be volatile memory (e.g., registers, cache, RAM), non-volatile memory (e.g., ROM, EEPROM, flash memory, etc.), or some combination of the two. The memory 320 stores software 380 implementing described techniques and tools for video image formats.

A computing environment may have additional features. For example, the computing environment 300 includes storage 340, one or more input devices 350, one or more output devices 360, and one or more communication connections 370. An interconnection mechanism (not shown) such as a bus, controller, or network interconnects the components of the computing environment 300. Typically, operating system software (not shown) provides an operating environment for other software executing in the computing environment 300, and coordinates activities of the components of the computing environment 300.

The storage 340 may be removable or non-removable, and includes magnetic disks, magnetic tapes or cassettes, CD-ROMs, CD-RWs, DVDs, or any other medium which can be used to store information and which can be accessed within the computing environment 300. For example, the storage 340 stores instructions for implementing software 380.

The input device(s) 350 may be a touch input device such as a keyboard, mouse, pen, or trackball, a voice input device, a scanning device, or another device that provides input to the computing environment 300. For video, the input device(s) 350 may be a video capture device (e.g., a digital video camera) or other device that accepts input in analog or digital form. The output device(s) 360 may be a display, printer, speaker, CD-writer, or another device that provides output from the computing environment 300.

The communication connection(s) 370 enable communication over a communication medium to another computing entity. The communication medium conveys information such as computer-executable instructions, audio/video or other media information, or other data in a modulated data signal. By way of example, and not limitation, communication media include wired or wireless techniques implemented with an electrical, optical, RF, infrared, acoustic, or other carrier.

Techniques and tools described herein can be described in the general context of computer-readable media. Computer-readable media are any available media that can be accessed within a computing environment. By way of example, and not limitation, with the computing environment 300, computer-readable media include memory 320, storage 340, and combinations of any of the above.

Some techniques and tools herein can be described in the general context of computer-executable instructions, such as those included in program modules, being executed in a computing environment on a target real or virtual processor. Generally, program modules include functions, programs, libraries, objects, classes, components, data structures, etc. that perform particular tasks or implement particular abstract data types. The functionality of the program modules may be combined or split between program modules as desired.

Computer-executable instructions may be executed within a local or distributed computing environment.

II. Image Formats for Video Capture, Processing, and Display

Described techniques and tools are directed to different surface formats for video data. Described techniques and tools are useful for displaying, capturing, and processing video in a computer system (e.g., a PC). Described techniques and tools provide efficient hardware processing and easy conversion between data of different bit precisions (e.g., between 10- and 16-bit representations). Described surface formats are associated with new FOURCC codes (i.e. 32-bit identifier tags) which indicate the format of the video data. Although many of the descriptions herein refer only to YUV formats for simplicity, described techniques and tools also can be applied to the Y'Cb'Cr color formats, or to other color spaces. In addition, although specific implementations involving 8-, 10- and 16-bit representations are described, described techniques and tools can be modified to include other higher or lower bit precisions.

In the descriptions herein, the term "surface" refers to an area in memory (e.g., video memory or system memory) where pixel data is stored. The "surface origin" is the upper left corner (i.e., pixel coordinates (0, 0)) of the surface. The "stride" of the surface (sometimes called the "pitch") is the width of the surface in bytes. Although the stride is a signed integer, given a surface origin at the upper-left corner, the stride is always positive. The "alignment" of a surface refers to the byte position at which lines in a surface originate. Typically, the alignment of the surface is at the discretion of the graphics display driver and its underlying hardware. For example, in some hardware implementations, a surface must always be DWORD aligned, that is, individual lines within a surface must originate on a DWORD (i.e., four-byte or 32-bit) boundary. Other alignments are possible, depending on implementation. For example, an alignment can be greater than 32 bits, depending on the needs of the hardware. In general, a WORD is a data unit consisting of two bytes, a DWORD is a data unit consisting of four bytes, and a QWORD is a data unit consisting of eight bytes.

If present, an alpha value indicates transparency. For example, in some implementations an alpha value of 0 indicates a completely transparent image, whereas an alpha value of $(2^n)-1$ indicates an opaque image, where n is the number of alpha bits. Alpha is assumed to be a linear value that is applied to each component after it has been converted into its normalized linear form.

A. FOURCC Codes

Figure 4:
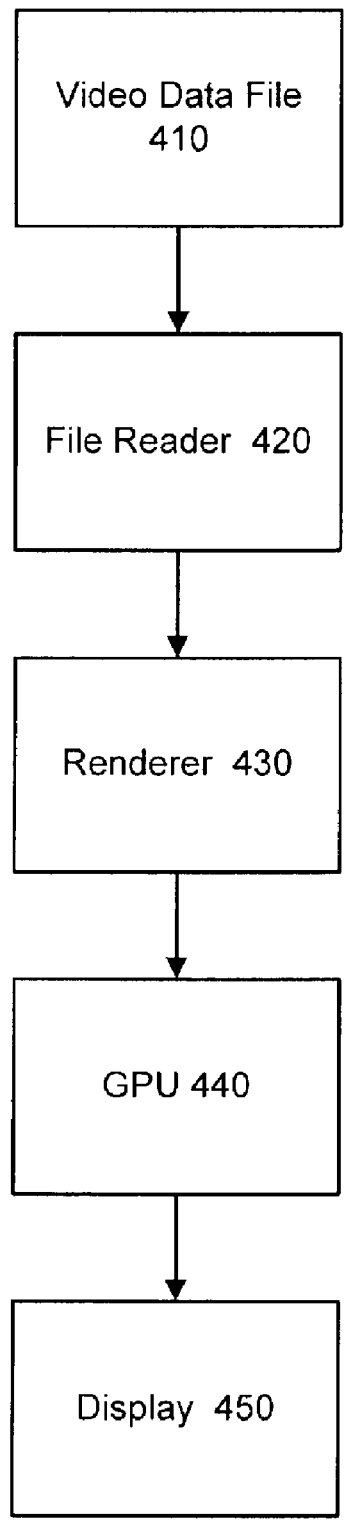
FIG. 4 is a block diagram of a computer system for reading and processing video data.

FOURCC codes are used to identify different video data formats. A FOURCC code is a 32-bit unsigned integer created by concatenating four ASCII characters. Typically, a FOURCC code is stored in a file (e.g., in a file header) along with video data. The FOURCC code identifies the format of the video data. The video hardware and/or software that processes the information can determine whether the video data is in a compatible format based on the FOURCC code. For example, in FIG. 4 a computer system 400 for reading and processing video data takes a video data file 410 as input into a file reader 420. The file reader 420 sends video data including a FOURCC code to a video renderer 430. Typically, the video renderer 430 determines whether the video data is compatible with the system based on the FOURCC code. If it is compatible, the video data is sent to the GPU 440 for processing and subsequent display on computer display 450.

Described techniques and tools include surface formats having corresponding FOURCC codes derived according to certain conventions. In naming conventions described herein, the first character of the FOURCC code indicates the packed and/or planar layout of the video data. The second character indicates a sub-sampling format (e.g., 4:4:4, 4:2:2, 4:2:0, 4:1:1). The third and forth characters indicate a bit precision (e.g., 8-bit, 10-bit, or 16-bit representation).

For example, in one embodiment, hybrid planar surface format codes start with the uppercase character literal "P." "P" is used to represent the fact that all the surface formats are planar in layout for the Y component. The packed surface format codes start with the uppercase literal "Y." The next character in the FOURCC code is determined by the chroma sub-sampling scheme, as shown in Table 2 below:

TABLE 2

| FOURCC code characters based on sub-sampling scheme | |
|---|---|
| Sub-sampling scheme | FourCC code letter |
| 4:4:4 | '4' |
| 4:2:2 | '2' |
| 4:1:1 | '1' |
| 4:2:0 | '0' |

The final two character literals are used to indicate whether the surface contains 8-, 10- or 16-bit data. 16-bit data is represented by the character literals "16," 10-bit data is represented by "10," and 8-bit data is represented by "08." Alternatively, one or more of these specific characters can be replaced with other characters in accordance with the naming conventions without affecting the ability of the FOURCC codes to effectively indicate the formats to which they correspond.

Several formats described in detail below have FOURCC codes that comply with the naming conventions described above. P016 and P010 are FOURCC codes for 16- and 10-bit versions of a hybrid planar 4:2:0 format; P216, P210 and P208 are FOURCC codes for 16-, 10- and 8-bit versions of a hybrid planar 4:2:2 format; Y216 and Y210 are FOURCC codes for 16- and 10-bit versions of a packed 4:2:2 format; and Y416 and Y410 are FOURCC codes for 16- and 10-bit versions of a packed 4:4:4 format. Other codes and formats also can be used. For example, although formats corresponding to the codes P116 and P110 (which would correspond to 16- and 10-bit versions of a hybrid planar 4:1:1 format) are not described in detail, such codes formats can be used in alternative implementations.

B. 16-Bit and 10-Bit Fixed-Point Representations

Figure 5:
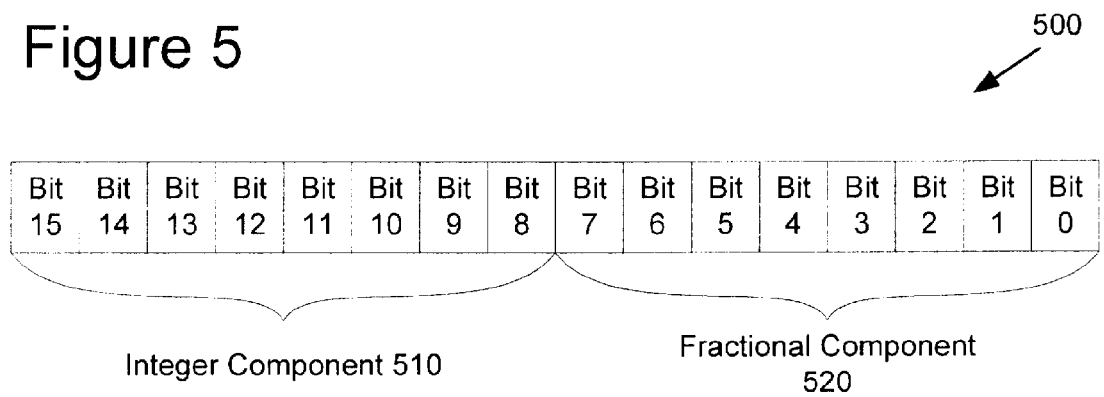
FIG. 5 is a block diagram showing a little-endian WORD representation of a 16-bit channel.

Described embodiments include techniques and tools for implementing 10- and 16-bit formats (e.g., in the YUV color space) using a fixed-point representation for the both the luma channel and the chroma channels. The 16-bit formats use little-endian WORDs of data. For example, FIG. 5 shows a little-endian WORD representation 500 of a 16-bit channel. In FIG. 5, an integer component 510 consists of bits 8-15, and a fractional component 520 consists of bits 0-7.

Figure 6:
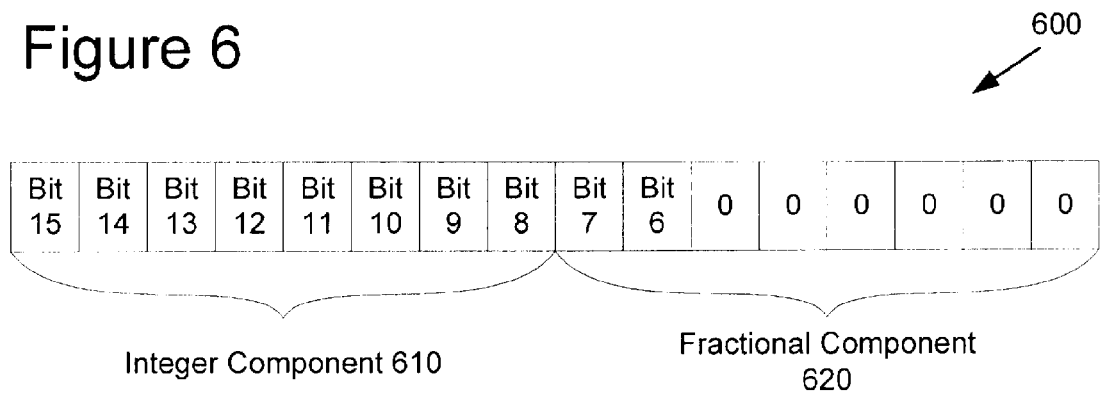
FIG. 6 is a block diagram showing a little-endian WORD representation of a 10-bit channel.

Described 10-bit formats also assign 16 bits to each channel. However, in the 10-bit formats, the lower order six bits of each little-endian WORD are cleared to zero. This allows data in a 16-bit format to be processed by existing 10-bit hardware, because the 10-bit system can simply drop the last 6 bits of the WORD. For example, FIG. 6 shows a little-endian WORD representation 600 of a 10-bit channel. In FIG. 6, the integer component 610 consists of bits 8-15, but only bits 6 and 7 are used in the fractional component 620. The lower six bits of the fractional component 620 are cleared to zero.

The memory layout of the 10-bit and 16-bit representations make it possible to cast a 10-bit representation of YUV data to a 16-bit representation (e.g., by adding 0s to the lower six bits of the fractional component) without loss of precision. The memory layout also makes it possible to cast a 16-bit representation to a 10-bit representation by dropping the lower six bits of the fractional component. When hardware reads a surface that contains a 10-bit representation, it can ignore the lower-order 6 bits. If the surface contains valid 16-bit data, it should be identified as a 16 bit surface. FOURCC codes can be used to identify 16-bit and 10-bit representations and to indicate how to appropriately process the video data and/or cast the video data into different representations.

Figure 7:
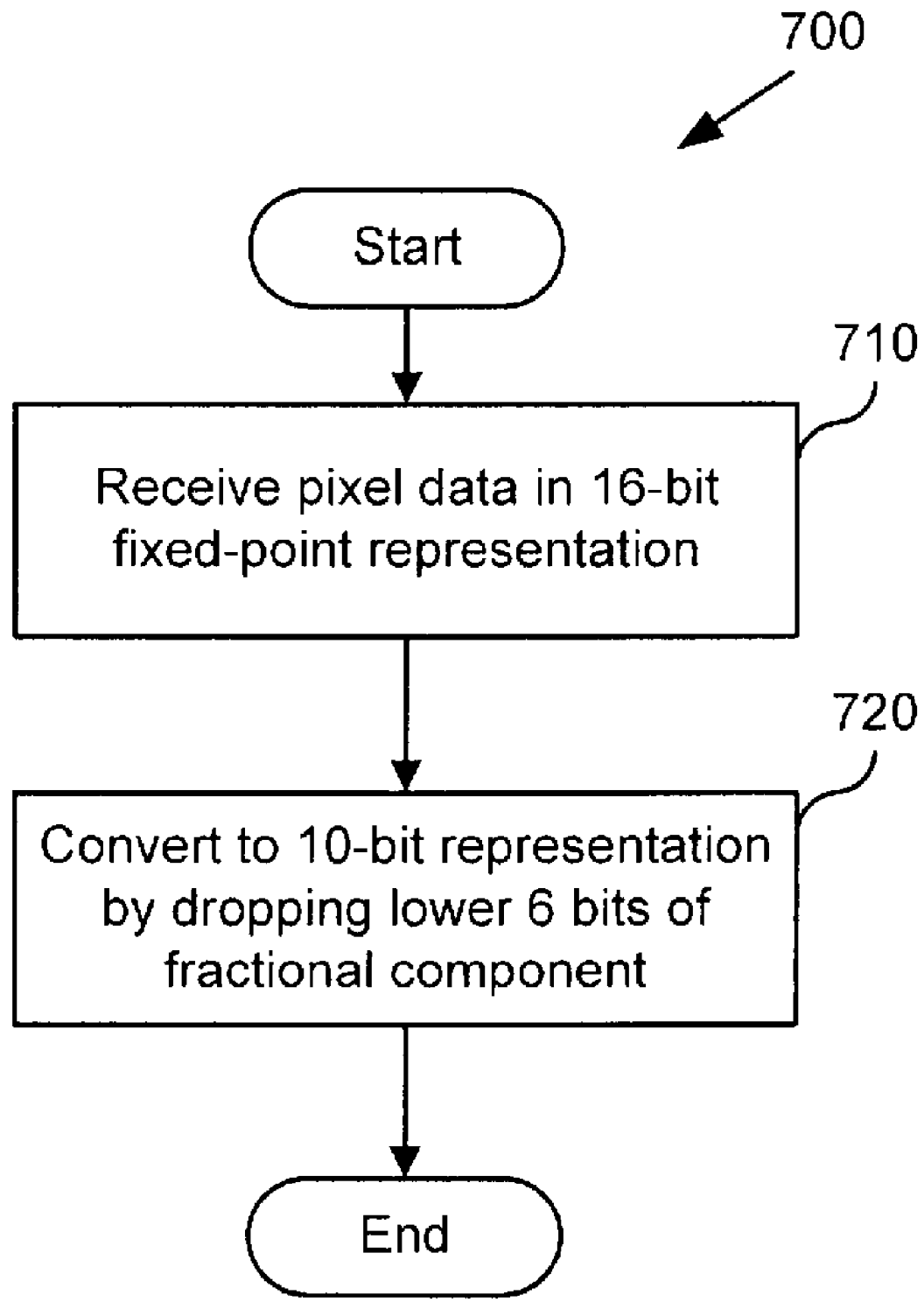
FIG. 7 is a flow diagram of a technique for converting a 16-bit fixed-point representation of pixel data into a 10-bit representation.

FIG. 7 shows an exemplary technique 700 for converting between different bit precisions. In particular, FIG. 7 shows a technique converting a 16-bit fixed-point representation of pixel data into a 10-bit representation. At 710, pixel data in 16-bit fixed point representation is received. Then, at 720, the data is converted to 10-bit representation by dropping the lower six bits of the fractional component. Based on the described memory layouts, other techniques for converting between different bit precisions also can be used (e.g., converting from 10- to 16-bit precisions, converting from 16- to 8-bit precisions, etc.)

SMPTE standard 274-1998 defines semantics on how to handle 10-bit and 16-10 bit forms of YUV as extensions of 8-bit data. In some implementations, the new "n" bit formats store the sample values as 8-bit values scaled by the factor $2^{n-8}$ in accordance with SMPTE 274-1998 sections 7.7, 7.8, 7.11 and 7.12. Precision conversions can be performed using simple shifts. For example, if a white point for an 8-bit format was at value 235, then the corresponding 10-bit representation would have a white point at 235*4=940.

Described 10- and 16-bit formats are advantageous because the data is most-significant-bit justified (i.e. the upper 8 bits always correspond to the 'integer' portion of the original fraction). The SMPTE standard assumes that higher bit representations of the same practical value are left shifts (i.e. multiples of 2) of the base value.

C. New Format Definitions

Techniques and tools for implementing new formats for video image data are described. The described formats for storing representations of video image data are defined in such a way that they are efficiently processed by video capture hardware, CPUs, video processing hardware (e.g., graphics processing units (GPUs)) and video display hardware (e.g., digital-to-analog converters (DACs)), and can be easily supported on current and future devices. In some cases, existing RGB hardware support can be re-used to implement described techniques and tools.

1. Hybrid Planar Format Definitions

Hybrid planar formats are formats having characteristics of both packed formats and planar formats. For example, in formats described herein luma information is stored separately from chroma information, with luma samples stored in one plane and chroma samples stored in packed format within another plane. Image operations can be performed separately on the luma and chroma planes. For example, the data for a YUV image is stored as a plane of Y samples followed by a plane of packed U and V samples. The pair of Y and U/V planes are often concatenated vertically, and the format can be referred to as a "hybrid planar" YUV surface format.

a. 4:2:0 Hybrid Planar Formats: P016 and P010

P016 and P010 are FOURCC codes for 4:2:0 16- and 10-bit hybrid planar representations, respectively. All Y samples are found first in memory as an array of little-endian WORDs with an even number of lines (possibly with a larger stride for memory alignment), followed immediately by an array of little-endian WORDs containing interleaved U and V samples.

The combined U-V array is addressed as an array of little-endian DWORD values (i.e. a U-V pair is a DWORD). The least significant WORD ("LSW") of each pair contains the U value and the most significant WORD ("MSW") contains the V value. The combined U-V array has the same total stride as the array of Y samples, but there are half as many lines of interleaved U-V samples as there are Y samples because the chroma channels are sub-sampled by a factor of two in the vertical dimension.

Figure 8:
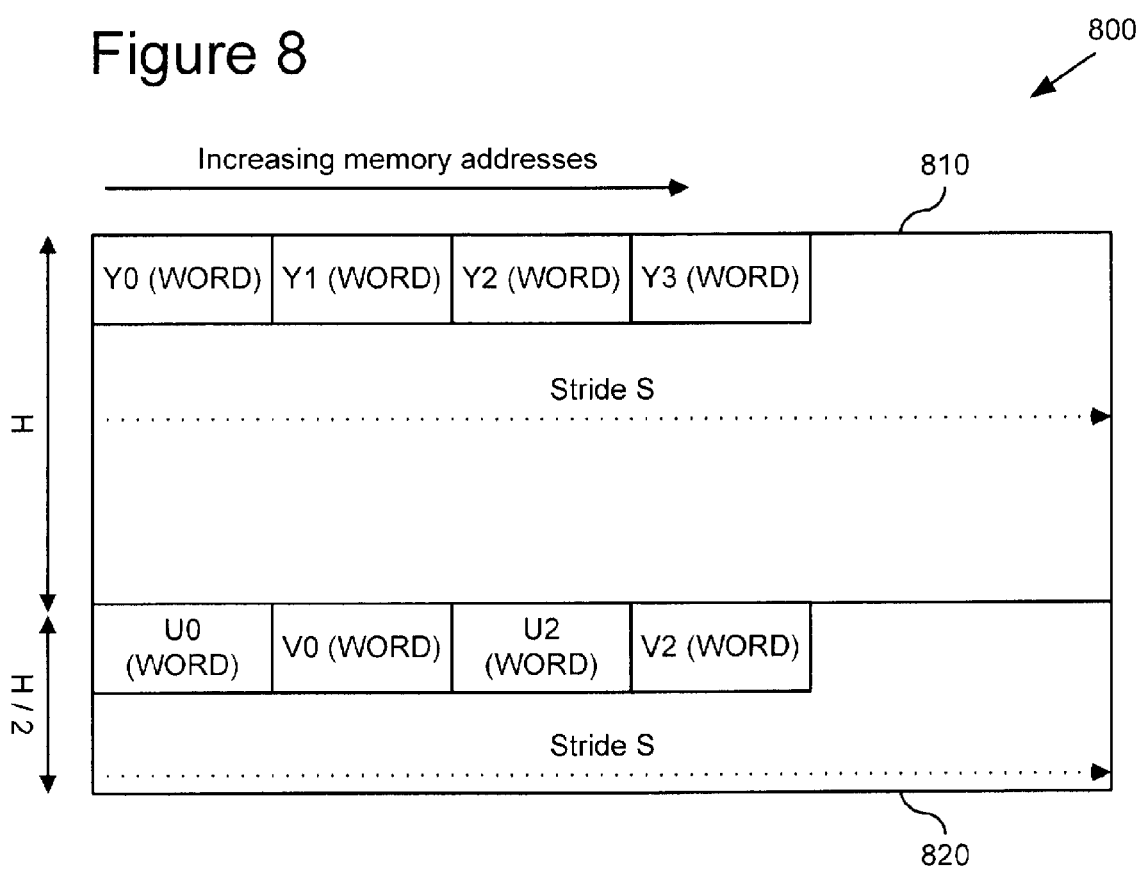
FIG. 8 is a block diagram showing a memory layout for the P016 and P010 formats.

For example, FIG. 8 shows a memory layout 800 for the P016 and P010 formats. FIG. 8 shows units of memory labeled Y0, Y1, Y2, Y3 in luma array 810 and U0, V0, U2 and V2 in chroma array 820. These labeled units of memory each represent a single little-endian WORD. In P016 and P010, the luma and chroma samples are in 16-bit representation and 10-bit representation, respectively. The U and V samples are packed: in each U-V DWORD pair, a one-WORD U sample is followed by a one-WORD V sample.

In one implementation, the P016 and P010 formats are preferred 4:2:0 planar pixel formats for 16- and 10-bit precision representations in systems supporting 16- and/or 10-bit 4:2:0 video.

b. 4:2:2 Hybrid Planar Formats: P216, P210 and P208

P216 and P210 are FOURCC codes for 4:2:2 16- and 10-bit representations, respectively, where all Y samples are found first in memory as an array of little-endian WORDs with an even number of lines (possibly with a larger stride for memory alignment), followed immediately by an array of little-endian WORDs containing interleaved U and V samples.

Figure 9:
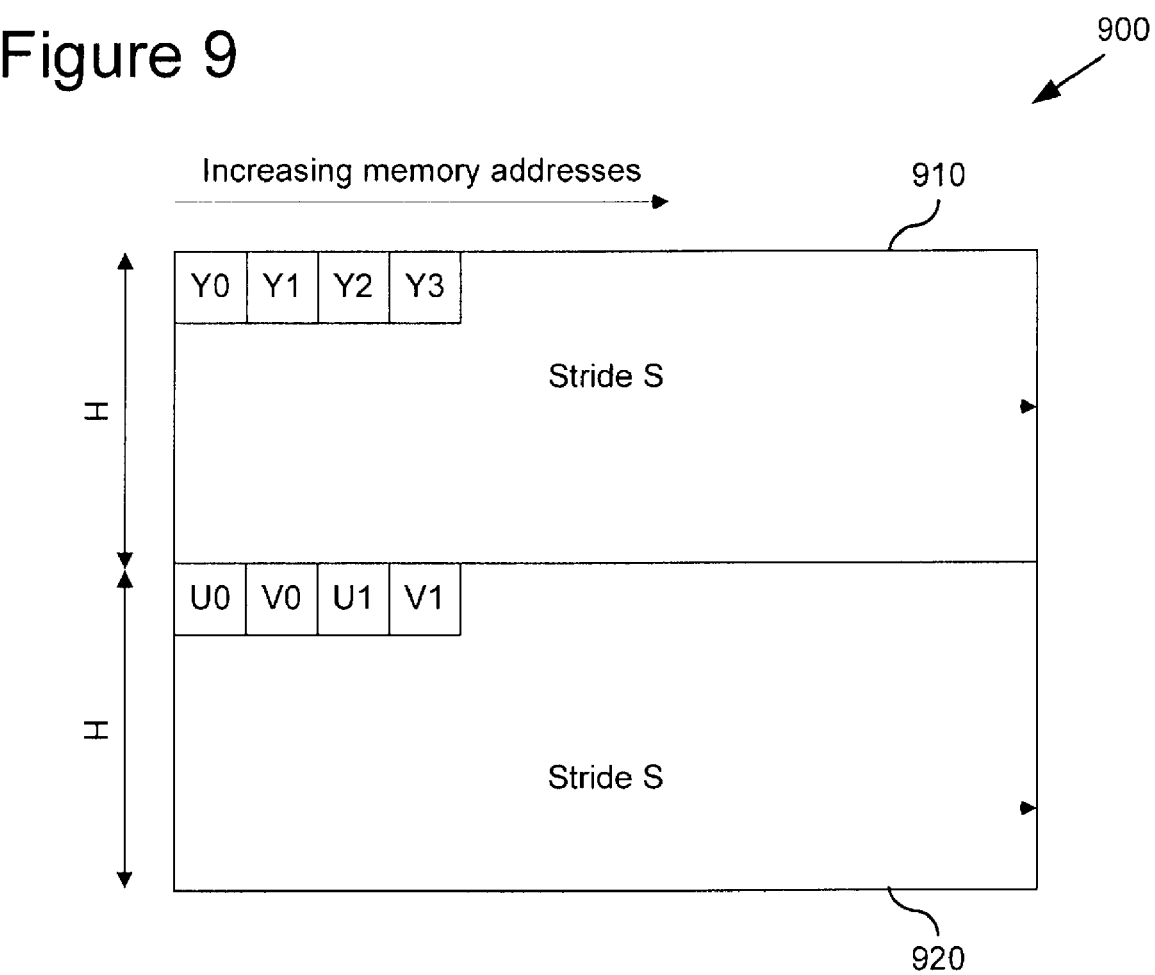
FIG. 9 is a block diagram showing a memory layout for the P216 and P210 formats.

The combined U-V array is addressed as an array of little-endian DWORD values (i.e. a U-V pair is a DWORD). The LSW of each pair contains the U value and the MSW contains the V value. The combined U-V array has the same total stride as the array of Y samples, and there are as many lines of interleaved U-V samples as there are lines of Y samples. For example, FIG. 9 shows a memory layout 900 for the P216 and P210 formats. FIG. 9 shows units of memory labeled Y0, Y1, Y2, Y3 in luma array 910 and U0, V0, U1 and V2 in chroma array 920.

In one implementation, the P216 and P210 formats are preferred 4:2:2 hybrid planar pixel formats for 16- and 10-bit precision representations in systems supporting 16- and/or 10-bit 4:2:2 video.

P208 is a FOURCC code for a 4:2:2 8-bit representation where all Y samples are found first in memory as an array of bytes. The array's width is a multiple of two (possibly with a larger stride for memory alignment) and is followed immediately by an array of byte pairs containing interleaved U and V samples. The stride of the array of U-V pairs must also be divisible by two.

Figure 10:
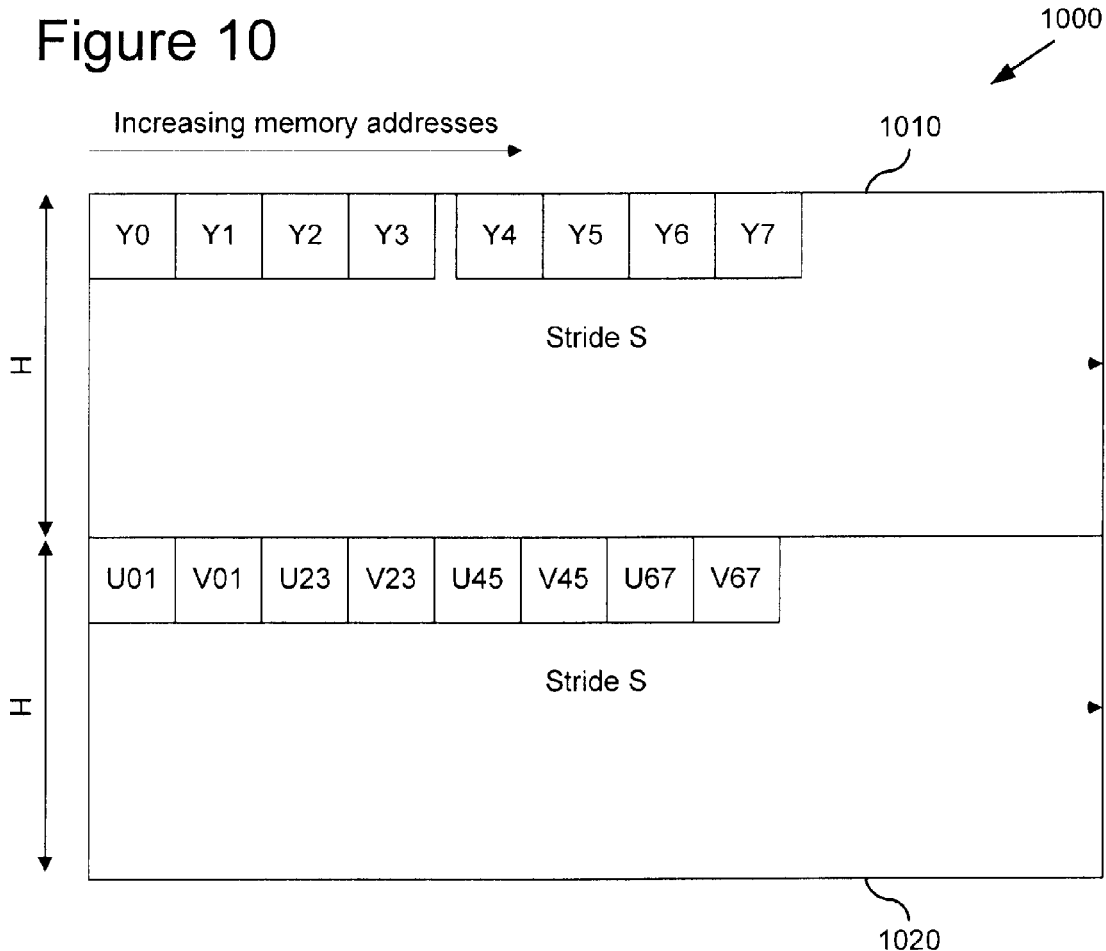
FIG. 10 is a block diagram showing a memory layout for the P208 format.

The combined U-V array is addressed as an array of little-endian WORD values (i.e. a U-V pair is a WORD) with the same total stride as the array of Y samples. The least-significant byte of each pair ("LSB") contains the U value and the most-significant byte ("MSB") contains the V value. Horizontally, there are exactly half as many interleaved U-V samples as there are Y samples. For example, FIG. 10 shows a P208 memory layout 1000. FIG. 10 shows units of memory labeled Y0, Y1, Y2, Y3, Y4, Y5, Y6 and Y7 in luma array 1010 and U01, V01, U23, V23, U45, V45, U67 and V67 in chroma array 1020. Each of these units of memory is a byte.

P208 is advantageous over packed 4:2:2 formats, especially for operations such as video encoding or decoding which require searching or accessing information on two independent planes (the luma plane and the chroma plane). (For further advantages of described hybrid planar formats, see section I.C.1.c. below)

In one implementation, the P208 format is a preferred 4:2:2 hybrid planar pixel format for 8-bit 4:2:2 representations.

c. Advantages of Described Hybrid Planar Formats

In some implementations, hybrid planar formats can achieve 5%-17% or better improvements in CPU processing (as compared with arrangements where chroma components are split into two separate planes). The factors involved in the improved processing include:

Smaller cache usage and better locality. With split planes (e.g., two chroma planes), each pixel fetch requires three cache locations—one for the luma plane, and one each for each chroma component plane. But when the chroma components are paired within the same plane, one chroma cache line holds both components, and only requires one fetch. This effectively cuts cache usage in half, since performing fetches on two planes uses twice as much cache. The cache line holds half as many pixels, but tends to contain spatially closer values that can be more readily used. When searching for neighboring pixels, similar behavior applies—more data around the pixel of interest tends to be read when pulling in the cache line of component pairs rather than two separate cache lines, and the cost of fetching unused "peripheral" pixels is reduced.

Tiled memory coherency. Video cards tend to tile their memory in 2×2 blocks (128 bit cache line tiles) and tile 256×256 regions into 8×8 "macroblock" tiles. Paired chroma components align well with 2×2 tiles.

Padding semantics. For images with a stride, padding semantics are well-defined. For example, in 4:2:0 and 4:2:2 formats, the chroma plane's data is the same width as the luma plane because the chroma data is sub-sampled by a factor of two, but the components are paired. Therefore, stride computations are simple and allow for arbitrary line alignments. On the other hand, split chroma panes put padding in the middle and right edge of an image, and do not allow for "uncommitted" memory (i.e. memory which is not physically present or accessible on the left side of the image. Split panes therefore have less support for unlockable or selectively lockable regions of the image. When locking an image, padding on the right hand side of an image may point to uncommitted memory, or memory in a tiled region which has a heavy access cost. If the padding is split between the middle of the image and the right side, the memory locking model does not work unless the size of the middle padding is made to be the same as the unlockable region on the right, which is a wasteful use of memory.

For example, if a line must be a multiple of 256 bytes, for an image of 720×480 the stride would be 768 bytes (thereby "wasting" 48 bytes per scanline). However, in 4:2:2 and 4:2:0 formats, after rounding up the luma plane lines to 768 bytes the chroma plane lines would be 384 bytes wide. To make the chroma plane lines a multiple of 256 bytes would require them to be rounded up from 384 bytes to 512 bytes. This would in turn require the luma plane to be rounded up to 1024 bytes. Thus, for the luma and chroma plane lines each be a multiple of 256 bytes, an additional 256 bytes are 'wasted' for every scanline.

Stride alignment. Image stride alignments are half as coarse, resulting in significant memory savings for standard definition content. Video hardware typically allocates memory at 256-byte boundaries due to 8×8 "macroblock" tiling. With modern CPUs (e.g., Intel CPUs with SSE2 technology), cache usage can be better controlled. Doubling pixel width increases cache alignments, and power-of-2 alignments fit better with cache lines.

Parallelization. When chroma data is of a lower spatial sampling frequency than luma data, using two planes of data (e.g., a luma plane followed by a plane of chroma pairs) naturally partitions the image into two independently accessible images, with one image (luma) at full resolution and another image (chroma) down-sampled from the full resolution (e.g., ½ or ¼ of the full resolution). This provides the opportunity for optimizations or simplifications for software and hardware processing algorithms to operate on the data with two independent operations (or even operations executable in parallel). Split chroma planes would require two overlapping chroma operations to be performed simultaneously, which may cause cache coherency degradations or interdependencies with multiple processing entities.

Amortized computational costs on chroma components. With split chroma planes, filtering coefficients, loops, etc. are typically identical when applied to each chroma plane. By working on the chroma components in pairs, the same computations (e.g., application of filtering coefficients) can be applied to both chroma components and only computed once for each pair of components.

2. Packed Format Definitions

In a packed format, the color data for one or more pixels are stored in consecutive bytes in the same array. Depending on implementation, processing pixels stored in a packed format may involve operating on individual pixels, pairs of pixels, or some other set of pixels. For example, in a 4:2:2 packed format in a YUV color space, a pair of chroma samples is shared by two pixels. Luma samples from the two different pixels are interleaved with the pair of chroma samples, and reading the data of one pixel would therefore require reading the data of both pixels. Data reads must therefore be performed on "pairs" of pixels in the 4:2:2 packed format.

a. 4:2:2 Packed Formats: Y210 and Y216

Figure 11:
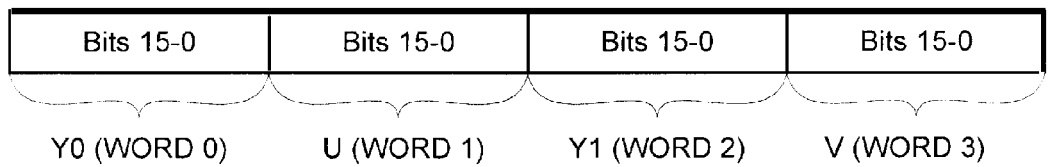
FIG. 11 is a block diagram showing a bit layout of a pair of Y216 or Y210 pixels.

Y216 and Y210 are the FOURCC codes for a packed 16-bit and 10-bit 4:2:2 format, respectively. Each individual Y, U and V value is encoded as a single little-endian WORD. Pairs of pixels are stored together in an array of four little endian WORDs. Y210 is identical to Y216 except that there are only 10 significant bits of data for each channel value, which are most-significant-bit justified in a 16-bit little endian WORD (i.e. only bits 15-6 are used; bits 5-0 are 0). For example, FIG. 11 shows a bit layout 1100 of a pair of Y216 or Y210 pixels. The WORDs labeled Y0, U, Y1 and V are packed together in a single array.

b. 4:4:4 Packed Formats: Y416 and Y410

Figure 12:
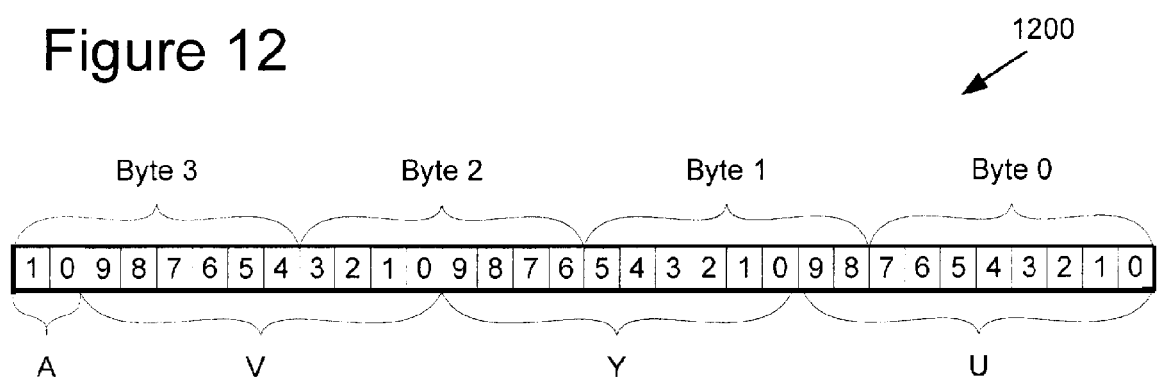
FIG. 12 is a block diagram showing a bit layout of a little-endian DWORD encoding a Y410 pixel.

Y410 is the FOURCC code for a packed 10-bit 4:4:4 representation that includes a two-bit alpha value. In Y410, each pixel is encoded as a single little endian DWORD with the individual Y, U, V and alpha channels laid out as shown in FIG. 12. The bit layout 1200 in FIG. 12 shows a little-endian DWORD encoding a Y410 pixel. The four bytes in the DWORD are labeled Byte 0, Byte 1, Byte 2 and Byte 3. The U channel takes up Byte 0 and two bits of Byte 1, the Y channel takes up six bits of Byte 1 and four bits of Byte 2, the V channel takes up four bits of Byte 2 and six bits of Byte 3, and the alpha channel (A) takes up the remaining two bits of Byte 3. Y410 allows the three 10-bit luma and chroma channels to be stored in one DWORD, with a two-bit alpha channel included for a 32-bit alignment. In one implementation, applications set the two alpha channel bits to the value 0x03 to indicate that the pixel is fully opaque.

Figure 13:
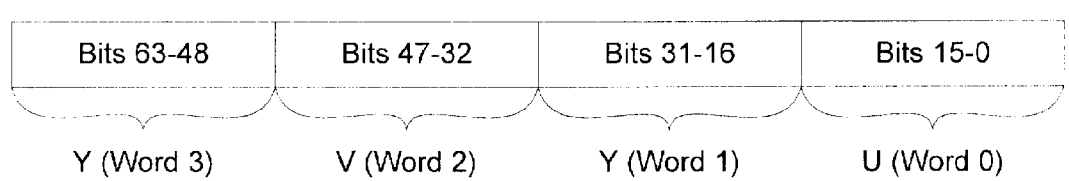
FIG. 13 is a block diagram showing a bit layout of a little-endian QWORD encoding a Y416 pixel.

Y416 is the FOURCC code for a packed 16-bit 4:4:4 representation that includes a 16-bit alpha value. In one implementation, the Y416 format is an intermediate format intended to avoid error accumulation in processing. Each pixel is encoded as a single little-endian QWORD with the individual Y, U, V and alpha channels laid out as shown in FIG. 13. This format is similar to a 16-bits per channel version of Y410. The bit layout 1300 in FIG. 13 shows a little-endian QWORD encoding a Y416 pixel. Because of the way a little-endian QWORD is used in the physical memory, the memory layout in FIG. 13 is "byte swapped." The U channel takes up WORD 0, the Y channel takes up WORD 1, the V channel takes up WORD 2, and the alpha channel (A) takes up WORD 3. The 16-bit alpha channel is included for a 64-bit alignment. In one implementation, applications set the alpha channel bits to the value 0xffff to indicate the pixel is fully opaque.

D. Existing Format Definitions

Existing formats can be used in combination with one or more of the described new formats or other techniques and tools. Brief descriptions of some of these formats and their corresponding FOURCC codes are provided below.

Figure 14:
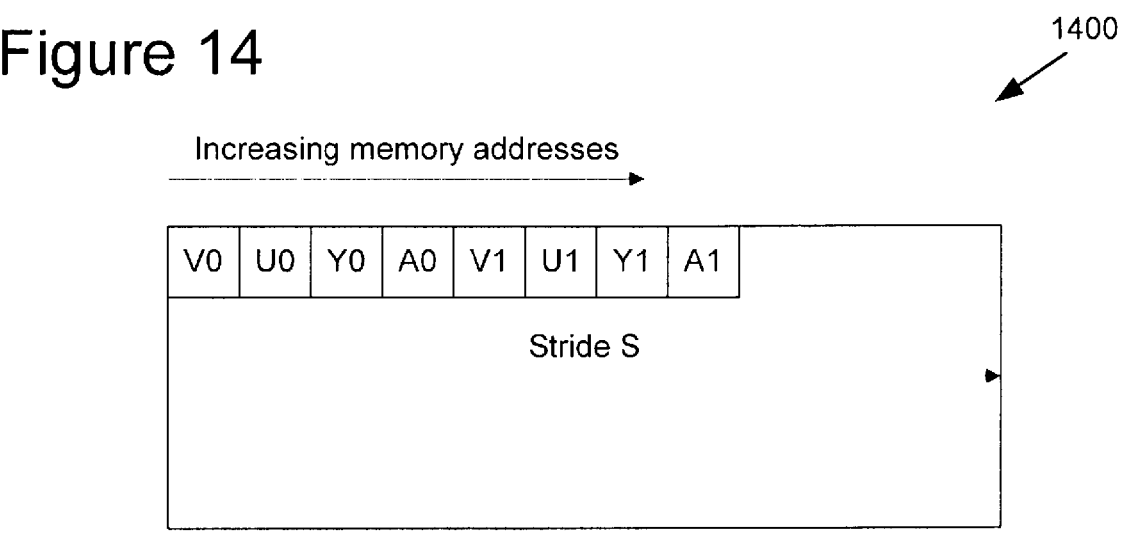
FIG. 14 is a block diagram showing an AYUV memory layout.

AYUV is a 4:4:4 packed format where each pixel is encoded as four consecutive bytes. FIG. 14 shows an AYUV memory layout 1400. Each labeled memory unit in FIG. 14 (V0, U0, etc.) is a byte.

Figure 15:
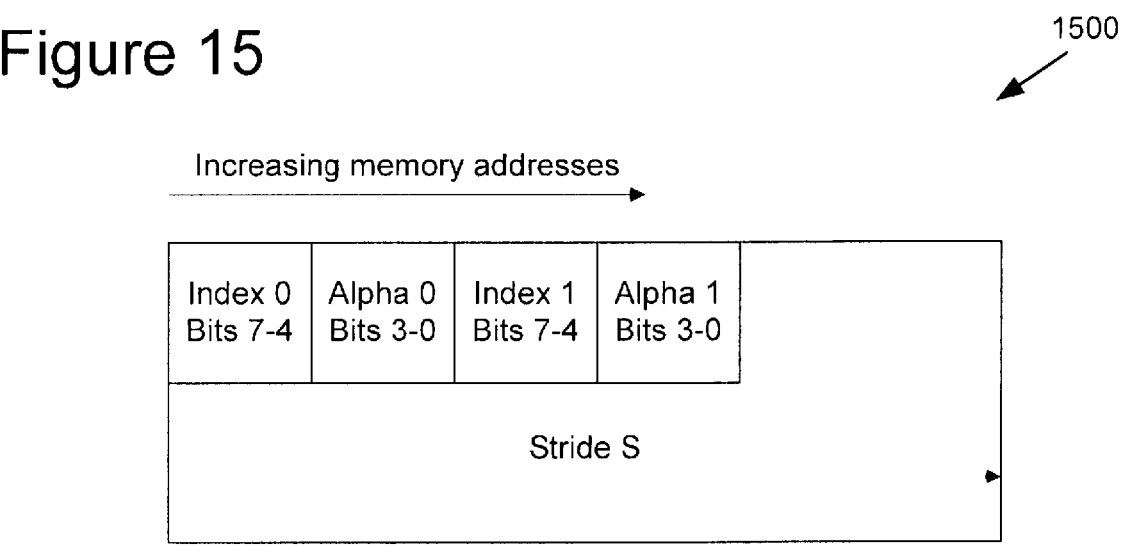
FIG. 15 is a block diagram showing an A144 memory layout.

AI44 is a 4:4:4, 16-entry paletted format with four bits of alpha per pixel. Each pixel is stored in a byte as four bits of index in the upper nibble and four bits of alpha in the lower nibble. FIG. 15 shows an AI44 memory layout 1500. Each labeled memory unit in FIG. 15 (Index 0, Alpha 0, etc.) is a nibble.

Figure 16:
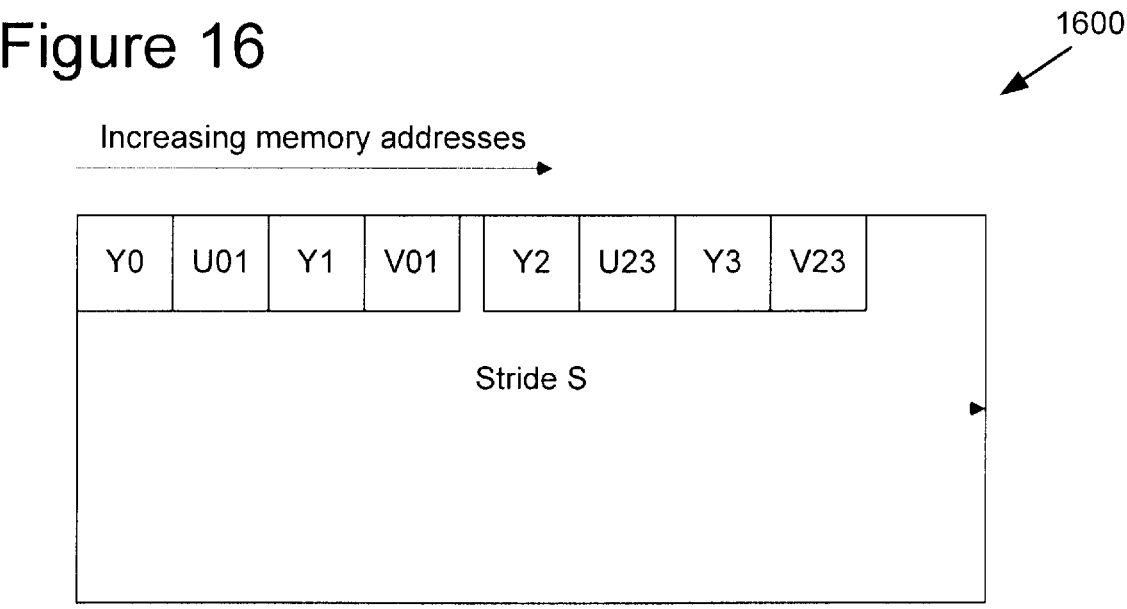
FIG. 16 is a block diagram showing a YUY2 memory layout.
Figure 17:
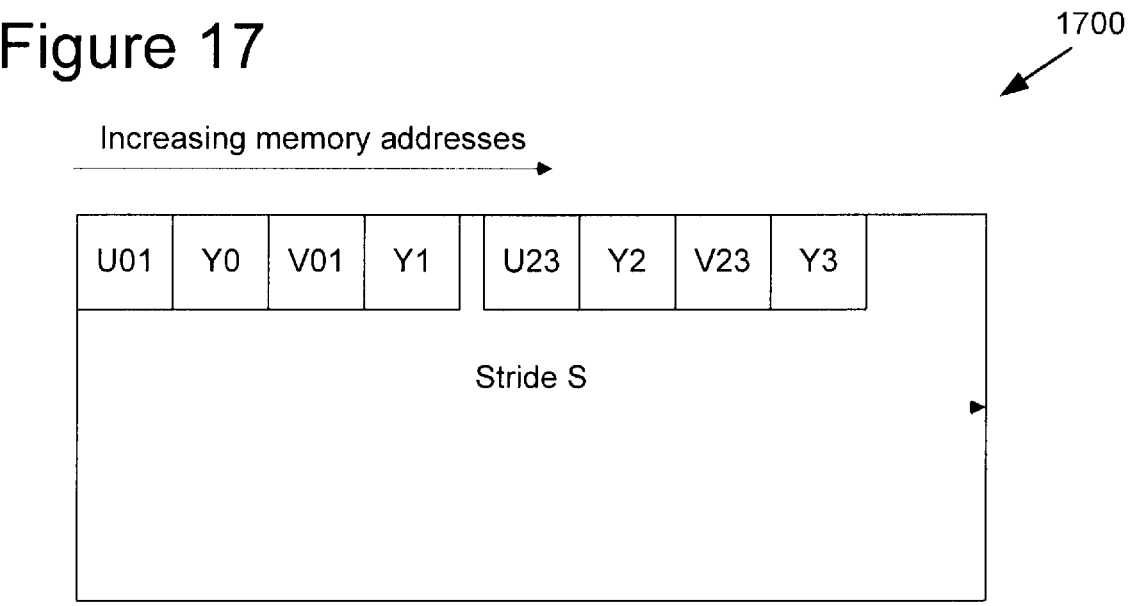
FIG. 17 is a block diagram showing UYVY a memory layout.

YUY2 and UYVY are 4:2:2 packed formats where each "macropixel" is two pixels encoded as four consecutive bytes, with chroma information down-sampled in the horizontal direction by a factor of two. FIG. 16 shows a YUY2 memory layout 1600. In FIG. 16, the first byte of the "macropixel" contains the first Y sample (Y0), the second byte contains the first U sample (U01), the third byte contains the second Y sample (Y1), and the fourth byte contains the first V sample (V01). The UYVY format is the same as YUY2 except that the byte pairs are exchanged. FIG. 17 shows a UYVY memory layout 1700.

Figure 18:
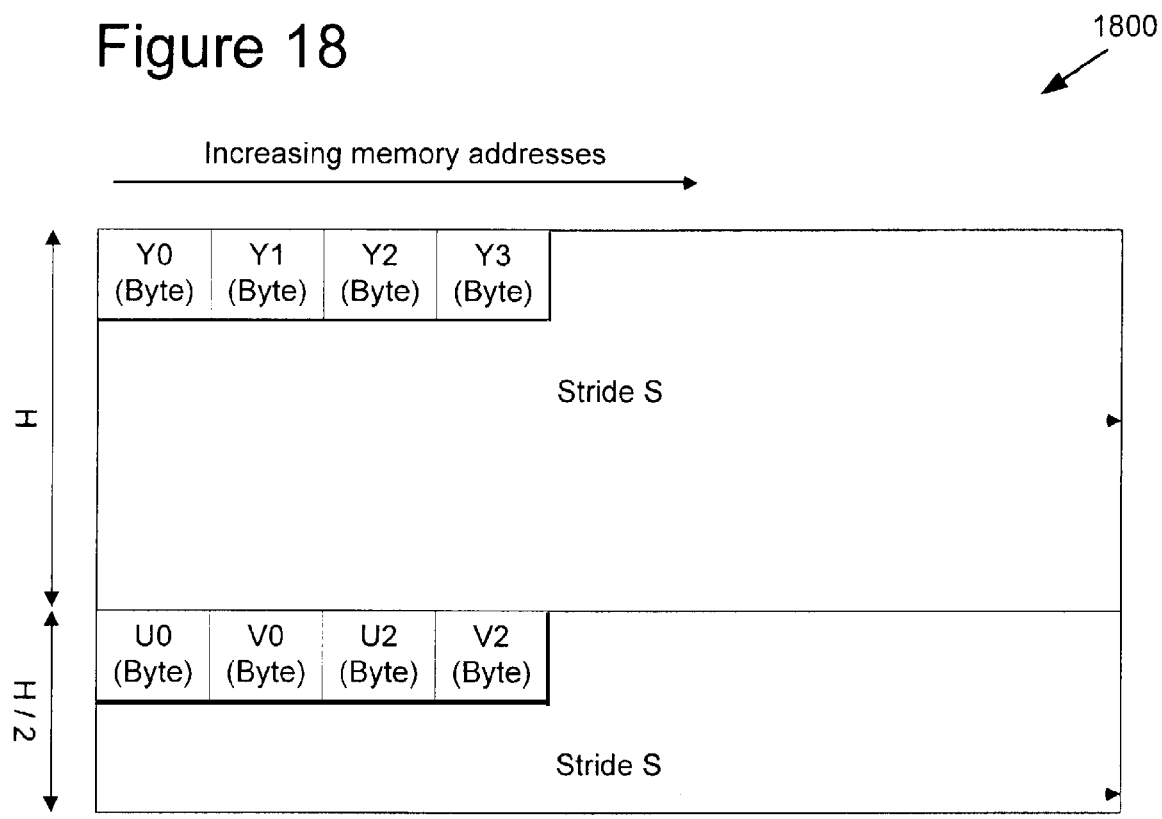
FIG. 18 is a block diagram showing an NV12 memory layout.

NV12 is an 8-bit 4:2:0 format where all Y samples are found first in memory as an array of bytes with an even number of lines (possibly with a larger stride for memory alignment), followed immediately by an array of byte pairs containing interleaved U and V samples. The combined U-V array is addressed as an array of little-endian WORD values (i.e. a U-V pair is a WORD). The least significant byte of each pair ("LSB") contains the U value and the most significant byte ("MSB") contains the V value with the same total stride as the Y samples. There are exactly half as many lines of interleaved U-V samples as there are Y samples. FIG. 18 shows an NV12 memory layout 1800. Each labeled memory unit in FIG. 18 (U0, V0, etc.) is a byte. In one implementation, NV12 is a preferred format for 8-bit 4:2:0 representations.

Figure 19:
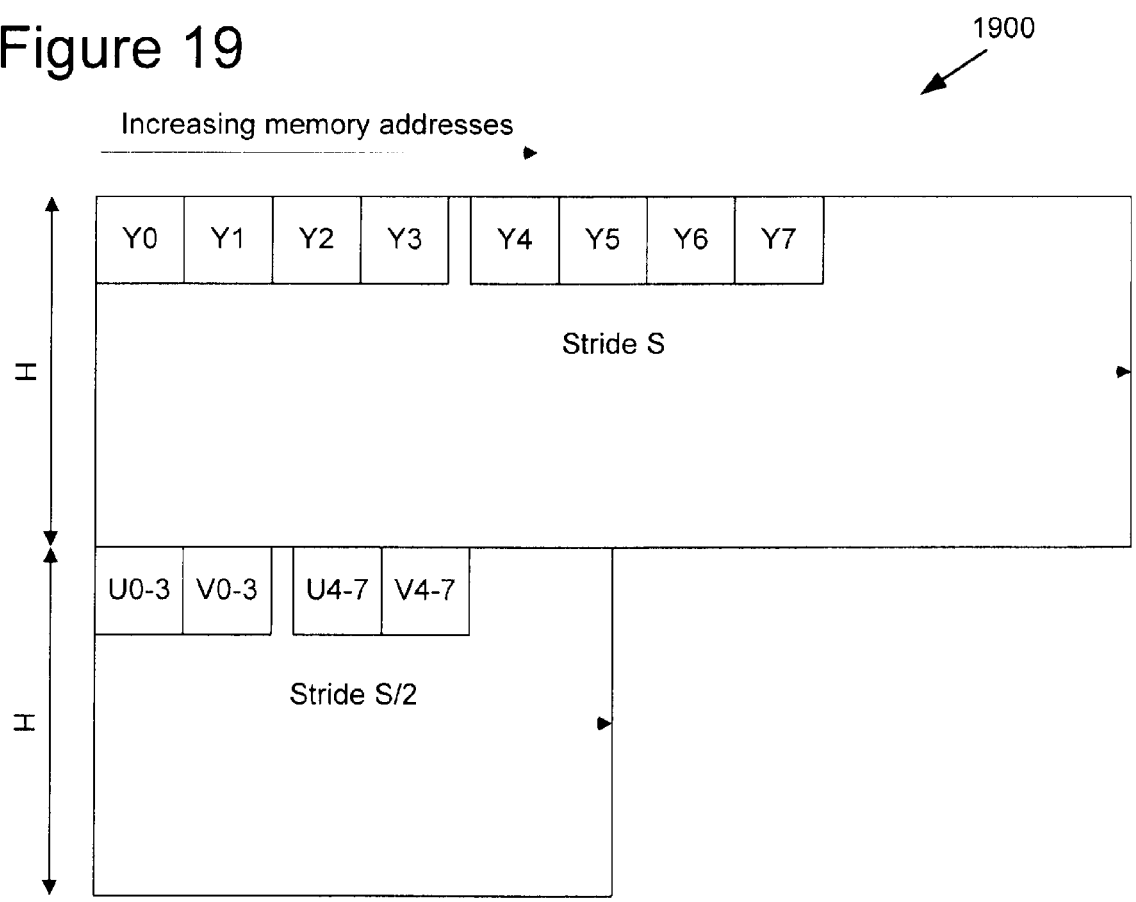
FIG. 19 is a block diagram showing an NV11 memory layout.

NV11 is an 8-bit 4:1:1 representation where all Y samples are found first in memory as an array of bytes whose width is a multiple of four (possibly with a larger stride for memory alignment), followed immediately by an array of byte pairs containing interleaved U and V samples. The stride must also be divisible by two. The combined U-V array is addressed as an array of little-endian WORD values (i.e. a U-V pair is a WORD). The LSB contains the U value and the MSB contains the V value with the same total stride as the Y samples. Horizontally, there are exactly one quarter as many interleaved U-V samples as there are Y samples. FIG. 19 shows an NV11 memory layout 1900. Each labeled memory unit in FIG. 19 (U0-3, V0-3, etc.) is a byte. In one implementation, NV11 is a preferred format for 8-bit 4:1:1 representations.

E. Example

Preferred Formats in One Implementation

In one implementation, different formats are preferred depending on characteristics of video data to be processed, desired visual quality of video, and/or capabilities of a computerized video system. In this exemplary implementation, the following formats (indicated by FOURCC codes) are preferred formats (preferred formats indicated as being "planar" have luma information in a separate plane from chroma information):

AI44—16-entry indexed paletted format with 4 bits alpha
AYUV—8-bit packed 4:4:4 format
YUY2 (or UYVY)—8-bit packed 4:2:2 format
NV11—8-bit planar 4:1:1 format
NV12—8-bit planar 4:2:0 format
P208—8-bit planar 4:2:2 format
Y210, Y216—packed 4:2:2 format (10-bit & 16-bit)
Y410, Y416—packed 4:4:4 format (10-bit & 16-bit)
P210, P216—planar 4:2:2 format (10-bit & 16-bit)
P010, P016—planar 4:2:0 format (10-bit & 16-bit)

Other implementations can support additional formats, omit some formats, or replace one or more of the listed formats with other formats.

Having described and illustrated the principles of our invention with reference to the described techniques and tools, it will be recognized that the described techniques and tools can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described implementations shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. A method of displaying a video image by a video processing system having a processor and a display, the method comprising:

the processor processing video data to produce the video image, the video data having a packed format representation, the video data consisting of color channel data and alpha channel data for each of plural pixels in the video image, the packed format representation having the color channel data and alpha channel data of each pixel arranged in a single bit array per group of at least one pixel, the packed format representation further having a color channel bit precision of greater than eight bits per color channel, and the packed format representation being represented by a total number of bits of the single bit array which is aligned with an integer multiple of an 8-bit byte but is not equal to an integer multiple of the color channel bit precision; and displaying the video image on the display.

2. The method of claim 1 wherein the color channel data has a bit precision of 10 bits per channel.

3. The method of claim 1 wherein the alpha channel data consists of 2 bits per pixel.

4. The method of claim 1 where the video data is in a 4:2:2 sub-sampling format.

5. The method of claim 1 where the video data is in a 4:4:4 sub-sampling format.

6. The method of claim 1 wherein the color channel data is in a YUV color space.

7. A computer-readable storage medium having instructions stored thereon executable by a computer system having a processor and a display for performing a method of displaying a video image, the method comprising:

the processor processing video data to produce the video image, the video data having a packed format representation, the video data consisting of color channel data and alpha channel data for each of plural pixels in the video image, the packed format representation having the color channel data and alpha channel data arranged in a single bit array per group of at least one pixel, the packed format representation further having a color channel bit precision of greater than eight bits per color channel, and the packed format representation being represented by a total number of bits of the single bit array which is aligned with an integer multiple of an 8-bit byte but is not equal to an integer multiple of the color channel bit precision; and displaying the video image on the display.

8. The computer-readable storage medium of claim 7 wherein the color channel data has a bit precision of 10 bits per channel.

9. The computer-readable storage medium of claim 7 wherein the alpha channel data consists of 2 bits per pixel.

10. The computer-readable storage medium of claim 7 where the video data is in a 4:2:2 sub-sampling format.

11. The computer-readable storage medium of claim 7 where the video data is in a 4:4:4 sub-sampling format.

12. The computer-readable storage medium of claim 7 wherein the color channel data is in a YUV color space.

* * * * *